(12) United States Patent
Kwon et al.

(10) Patent No.: US 7,091,769 B2
(45) Date of Patent: Aug. 15, 2006

(54) VOLTAGE GENERATOR WITH REDUCED NOISE

(75) Inventors: Myeong Ju Kwon, Seoul (KR); Jae Jin Lee, Icheon-si (KR)

(73) Assignee: Hynix Semiconductor Inc., Gyeonggi-do (KR)

( * ) Notice: Subject to any disclaimer, the term of this patent is extended or adjusted under 35 U.S.C. 154(b) by 226 days.

(21) Appl. No.: 10/626,766

(22) Filed: Jul. 25, 2003

(65) Prior Publication Data

US 2004/0130300 A1 Jul. 8, 2004

(30) Foreign Application Priority Data

Nov. 29, 2002 (KR) ................ 10-2002-0075290

(51) Int. Cl.
*G05F 1/10* (2006.01)
(52) U.S. Cl. .................. 327/535; 327/536; 363/60
(58) Field of Classification Search ........... 327/536, 327/537, 535; 363/60
See application file for complete search history.

(56) References Cited

U.S. PATENT DOCUMENTS

| 5,337,284 | A | * | 8/1994 | Cordoba et al. ............ 327/540 |
| 5,929,693 | A | * | 7/1999 | Kuroda ...................... 327/535 |
| 6,052,022 | A | * | 4/2000 | Lee .......................... 327/589 |
| 6,128,242 | A | * | 10/2000 | Banba et al. ............... 365/226 |
| 6,275,096 | B1 | * | 8/2001 | Hsu et al. ................... 327/535 |
| 6,356,499 | B1 | * | 3/2002 | Banba et al. ............... 365/226 |
| 6,414,881 | B1 | * | 7/2002 | Fujii et al. ............. 365/189.09 |
| 6,424,578 | B1 | | 7/2002 | Sim et al. |
| 6,429,725 | B1 | * | 8/2002 | Tanzawa et al. ............ 327/536 |
| 6,498,761 | B1 | * | 12/2002 | Banba et al. ............... 365/226 |
| 6,507,237 | B1 | * | 1/2003 | Hsu et al. ................... 327/538 |
| 6,535,447 | B1 | | 3/2003 | Kim et al. |
| 6,552,600 | B1 | * | 4/2003 | Walimbe et al. ............ 327/536 |
| 6,765,428 | B1 | * | 7/2004 | Kim et al. .................. 327/634 |
| 2001/0053097 | A1 | | 12/2001 | Sim et al. |
| 2002/0064078 | A1 | | 5/2002 | Kim et al. |
| 2002/0084833 | A1 | * | 7/2002 | Kim et al. .................. 327/536 |

FOREIGN PATENT DOCUMENTS

| JP | 11-45572 | 2/1999 |
| JP | 2000-340756 | 7/2001 |
| JP | 2002-42465 | 2/2002 |
| KR | 1020010028064 A | 4/2001 |

* cited by examiner

*Primary Examiner*—Terry D. Cunningham
(74) *Attorney, Agent, or Firm*—Heller Ehrman LLP

(57) ABSTRACT

A voltage generator with reduced noise features a detector, a controller, a sub-booster, a main booster and a voltage adder. The detector receives an output voltage, a first reference voltage and a second reference voltage lower than the first reference voltage, and then outputs a first sensing signal and a second sensing signal. The controller receives the first sensing signal and the second sensing signal and an action signal to output a first control signal and a second control signal. The sub-booster boosts a voltage in response of the first control signal. The main booster boosts a voltage in response to the second control signal. The voltage adder adds output signals from the sub-booster and main booster, to provide the output voltage.

13 Claims, 8 Drawing Sheets

VOLTAGE GENERATOR WITH REDUCED NOISE

BACKGROUND OF THE INVENTION

1. Field of the Invention

The present invention generally relates to voltage generators, and more specifically, to a charge-pumping type voltage generator configured to reduce noise.

2. Description of the Prior Art

In conventional DRAMs, charges are pumped to generate a driving voltage for driving wordlines and bitlines without loss of threshold voltage. During DRAM operations, such as wordline-driving and bitline-precharging, a great amount of energy is consumed and then a level of the driving voltage becomes lower. In this case, the time when the level of the driving voltage becomes lower than a target level is detected in the conventional art to pump charges and maintain the level of the driving voltage.

FIG. 1 is a block diagram illustrating a conventional voltage generator. The conventional voltage generator comprises a detector 10, an oscillator 20, a control driver 30 and a pump 40. The detector 10 detects a level of a driving voltage Vpp. The oscillator 20 responds to an output signal from the detector 10. The control driver 30 responds to an output signal from the oscillator 20. The pump 40 pumps charge in response to an output signal from the control driver 30 to output the driving voltage Vpp.

FIGS. 2a and 2b are circuit diagrams illustrating the conventional voltage generator of FIG. 1. The detector 10 divides the driving voltage Vpp to obtain a detection voltage Vpps. Then, the detector 10 compares the detection voltage Vpps with a reference voltage Vrc to output a low level signal when the detection voltage is larger than the reference voltage Vrc, and vice versa. The detection voltage Vpps is represented by the following equation:

$$V_{pps} = \frac{R_3 + R_4}{R_1 + R_2 + R_3 + R_4} \times Vpp$$

When the output signal from the detector 10 is at the low level, that is, the detection voltage Vpps is smaller than the reference voltage Vrc, an oscillating signal is outputted from the oscillator. The control driver 30 outputs control signals p1, p2, g1 and g2 in response to the oscillating signal from the oscillator 20. The pump 40 outputs the driving voltage Vpp, controlled by the control signals p1, p2, g1 and g2 from the control driver 30. The capacitors C1 and C2 are precharged in response to the control signals p1 and p2. The driving voltage Vpp, which is larger than an externally applied voltage Vext, is generated by transmitting the charges stored in the capacitors C1 and C2 in response to the control signal g1 and g2.

FIG. 3 is a timing diagram illustrating the operation of the conventional voltage generator. When the wordline is activated or the bitline is precharged, the level of driving voltage Vpp starts to fall. At a time of t1, the detector 10 detects that the driving voltage Vpp falls below the target level. At a time of t2, the pump 40 starts to pump charge. The level of driving voltage Vpp rises because of the charge pumping operation of the pump 40. At a time of t3, the detector 10 detects the driving voltage Vpp at the target level, and commands the pump 40 to stop pumping charge. However, it is at a time of t4 that the actual pumping operation of the pump 40 stops due to the response time of the circuit.

As described above, in the conventional voltage generator, fluctuation ΔVpp of the driving voltage Vpp becomes large, due to the time delay between the point when the detector 10 actually detects the target level and the point when the pump 40 starts or stops operating, which results in unnecessary power consumption. Importantly, this fluctuation of the driving voltage causes noise that may destabilize the power source.

SUMMARY OF THE INVENTION

The present invention has an object to reduce fluctuation of driving voltage Vpp by pumping a predetermined amount of charge according to an operation of a DRAM when the driving voltage Vpp reaches a predetermined level before a target level.

In an embodiment of the present invention there is provided a voltage generator comprising: a detector for comparing an output voltage with a first reference voltage and a second reference voltage lower than the first reference voltage to output a first sensing signal and a second sensing signal; a controller for receiving the first sensing signal and the second sensing signal, and an action signal to output a first control signal and a second control signal; a sub-booster for boosting a voltage in response to the first control signal; a main booster for boosting a voltage in response to the second control signal; and a voltage adder for adding output signals from the sub-booster and the main booster to provide the output voltage.

BRIEF DESCRIPTION OF THE DRAWINGS

The disclosure will be described in terms of several embodiments to illustrate its broad teachings. Reference is also made to the attached drawings.

DETAILED DESCRIPTION OF THE PREFERRED EMBODIMENTS

The present invention will be described in detail with reference to the attached drawings.

Figure 1:
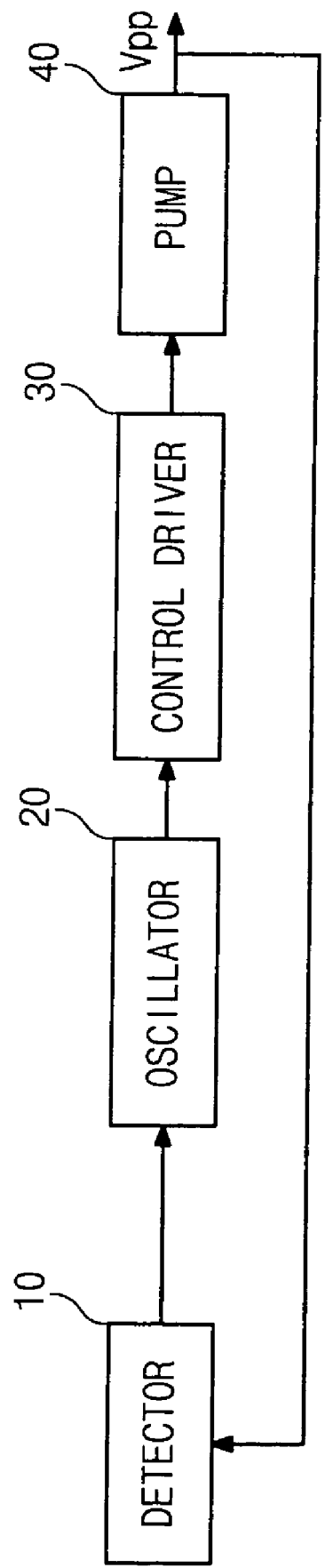
FIG. 1 is a block diagram illustrating a conventional voltage generator.
Figure 2A:
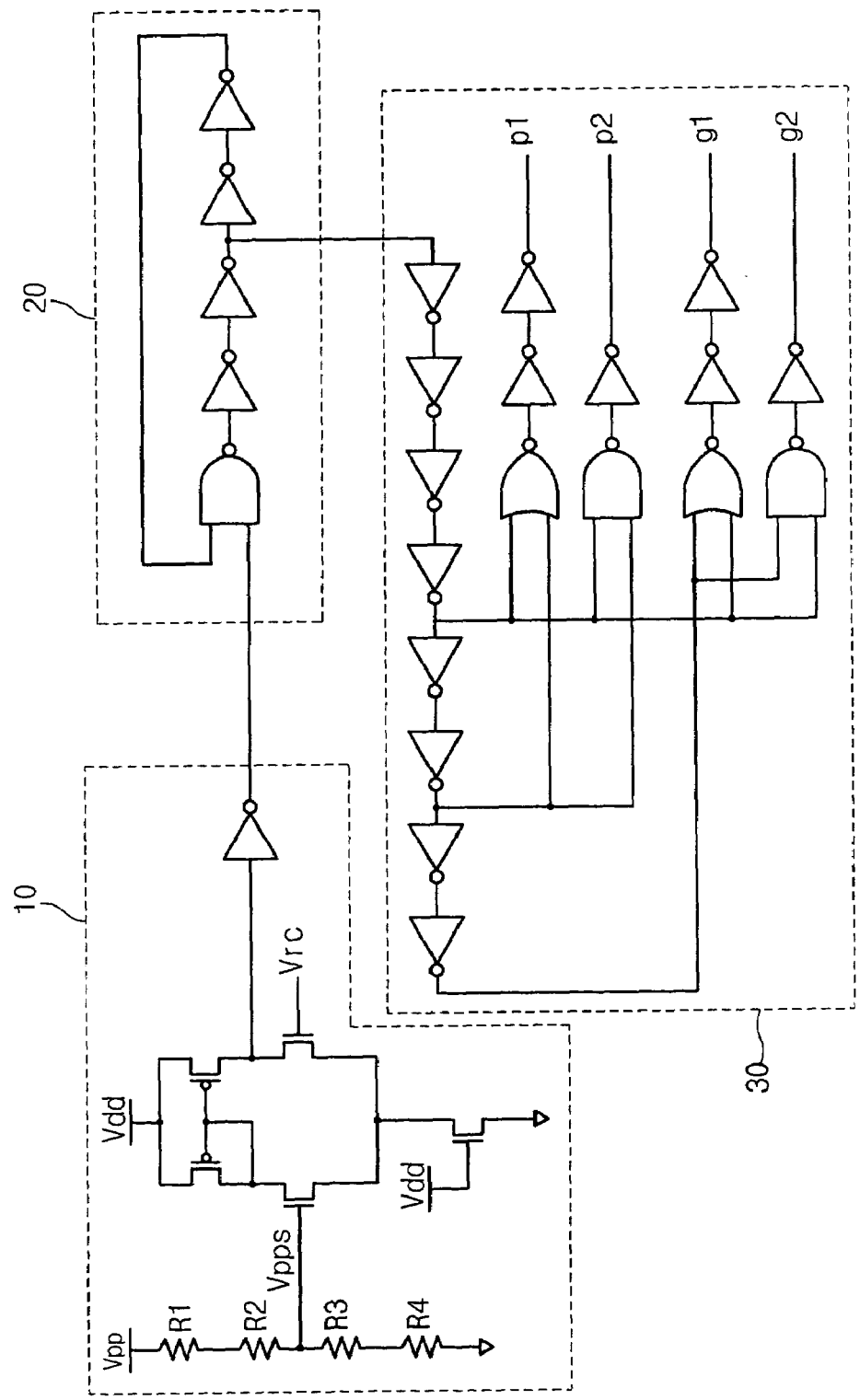
FIGS. 2a and 2b are circuit diagrams illustrating the conventional voltage generator.
Figure 2B:
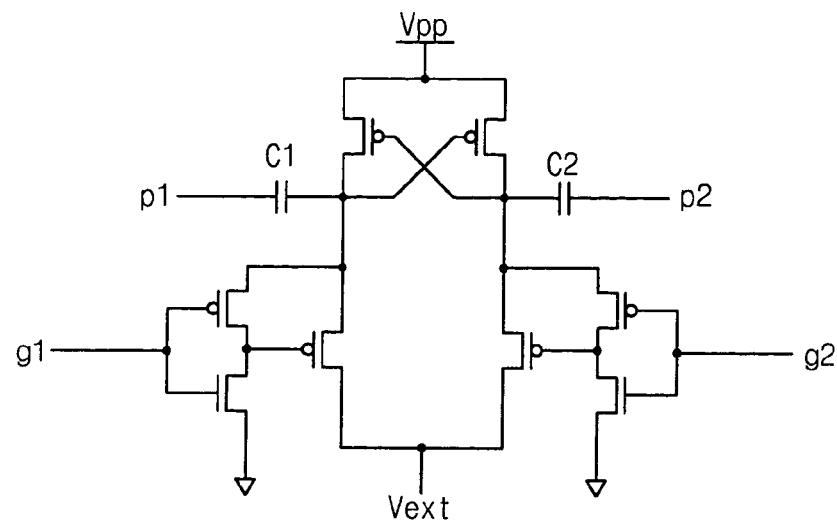
Figure 3:
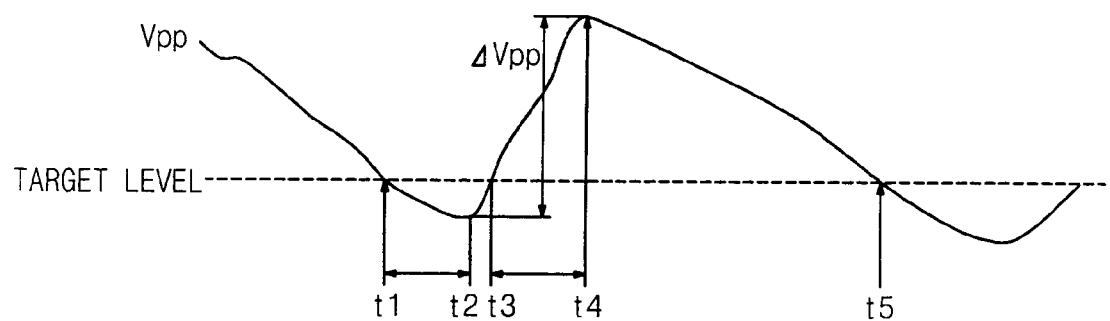
FIG. 3 is a timing diagram illustrating the conventional voltage generator.
Figure 4:
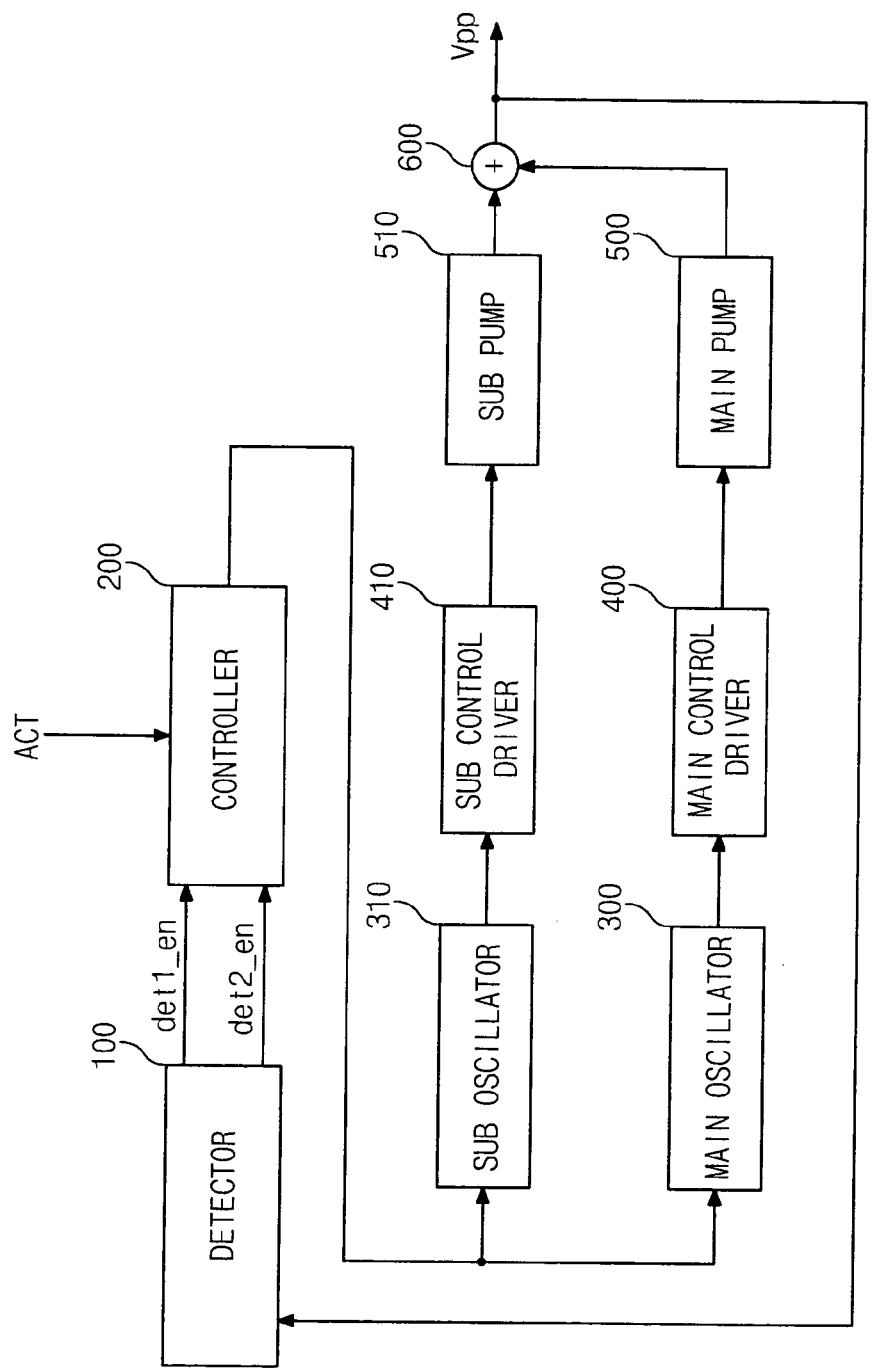
FIG. 4 is a block diagram illustrating a voltage generator according to an embodiment of the present invention.

FIG. 4 is a block diagram illustrating a voltage generator according to an embodiment of the present invention.

In this embodiment, the disclosed voltage generator comprises a detector 100, a controller 200, a main oscillator 300, a sub-oscillator 310, a main control driver 400, a sub-control driver 410, a main pump 500, a sub-pump 510 and a voltage adder 600. The detector 100 has more than two detection levels. The controller 200 outputs a control signal when an action signal ACT is inputted after a driving voltage Vpp passes a predetection level and before a driving voltage Vpp reaches a target level. The main oscillator 300 and the sub-oscillator 310 output oscillating signals in response to the control signal outputted from the controller 200. The main control driver 400 and the sub-control driver 410 output pump control signals in response to the oscillating signals outputted from the main oscillator 300 and the sub-oscillator 310. The main pump 500 and the sub-pump 510 pump voltages in response to the pump control signals outputted from the main control driver 400 and the sub-control driver 410. The voltage adder 600 adds the voltages outputted from the main pump 500 and the sub-pump 510, and then outputs the added voltage as a driving voltage. The driving voltage is fed back to the detector 100.

The level of driving voltage Vpp falls because of action on the memory device or charge leakage consumes charge. The point and amount of charge consumption due to a specific action can be predicted by stimulation.

The following is described using an action for activating a wordline or precharging a bitline as an example. For the purposes of this example it is assumed that the charge consumed during a wordline activation is Q1, which is obtained through stimulation, and that the reservoir capacitance is C1. When the wordline is activated, the range of fluctuation of driving voltage Vpp becomes Q1/C1. Additionally, if the charge consumption is Q2, the fluctuation of driving voltage Vpp becomes Q2/C1. Accordingly, the fluctuation of driving voltage Vpp can be reduced by pre-pumping and providing the predetermined amount of charge.

In order to prevent the level of the driving voltage Vpp from rising too high above the target level, a predetermined level that is higher than the target level is set as a predetection level and the charges are pre-pumped only when the level of the driving voltage Vpp becomes lower than the predetection level. If an action command is inputted at a point when the driving voltage Vpp is lower than the predetection level but higher than the target level, the disclosed voltage generator pre-pumps charges necessary for an action according to a given action command. As a result, the fluctuation of the driving voltage Vpp can be reduced in the disclosed voltage generator.

When the amount of charge actually consumed is larger than the predicted amount, the level of the driving voltage Vpp becomes lower than the target level. In that case, the disclosed voltage generator pumps charges in the same way as a conventional voltage generator does. When the amount of charge actually consumed is smaller than the predicted amount, the driving voltage Vpp is maintained over the target level and the DRAM performs a normal operation. In addition, since the pumping starts only when the level of the driving voltage Vpp becomes lower than the predetection level, the excessive rise of the driving voltage Vpp due to charge pumping can be prevented by properly regulating the predetection level.

Although a preferred embodiment of the present invention uses only two detection levels, one as a predetection level and the other as a target level, the number of detection levels is increased beyond two according to other preferred embodiments.

Figure 5:
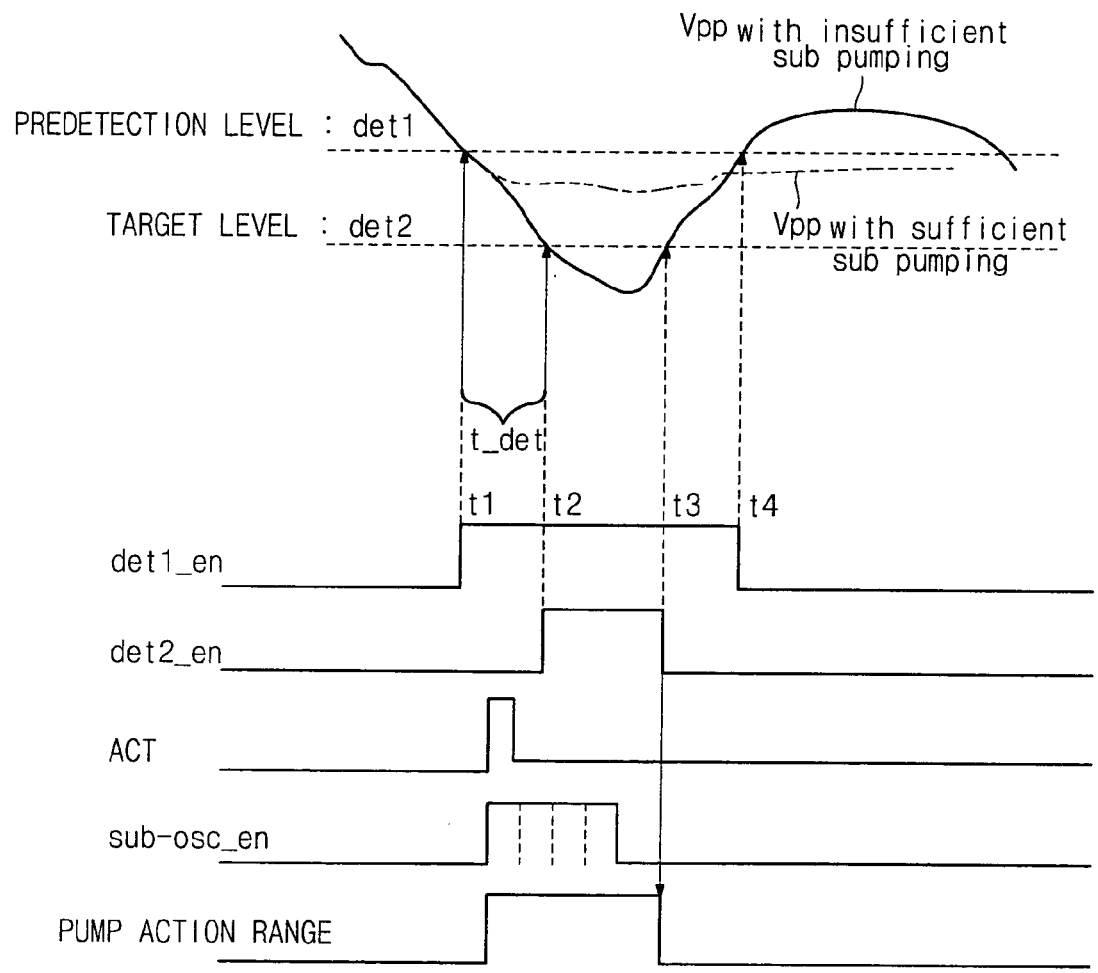
FIG. 5 is a timing diagram illustrating the voltage generator according to an embodiment of the present invention.

FIG. 5 is a timing diagram illustrating the voltage generator according to the present invention.

The detector 100 activates a predetection level signal del_en and a target level signal det2_en when detecting a predetection level det1 and a target level det2 (t1, t2). If the predetection level signal det1_en is activated, and an action command ACT is inputted before activation of the target level signal det2_en (t_det), the controller 200 activates a sub-pump control signal sub_pump_en. When the sub-pump control signal sub_pump_en is activated, the sub-oscillator 310, the sub-control driver 410 and the sub-pump 510 sequentially start to operate. If the target level signal det2_en is activated, the main pump 500 starts to operate after a predetermined response time. The amount of time during which the sub-pump 510 performs a pumping operation is determined by the action command ACT. Here, the period of time when the sub-pump 510 performs a pumping operation can overlap with that of the main pump 500. The sub-pumping can be stopped during the main pumping operation according to a preferred embodiment. At a time of t3, the detector 100 detects that the driving voltage Vpp is recovered to the target level. At a time of t4, the main pump 500 stops pumping charges after a predetermined response time.

Figure 6A:
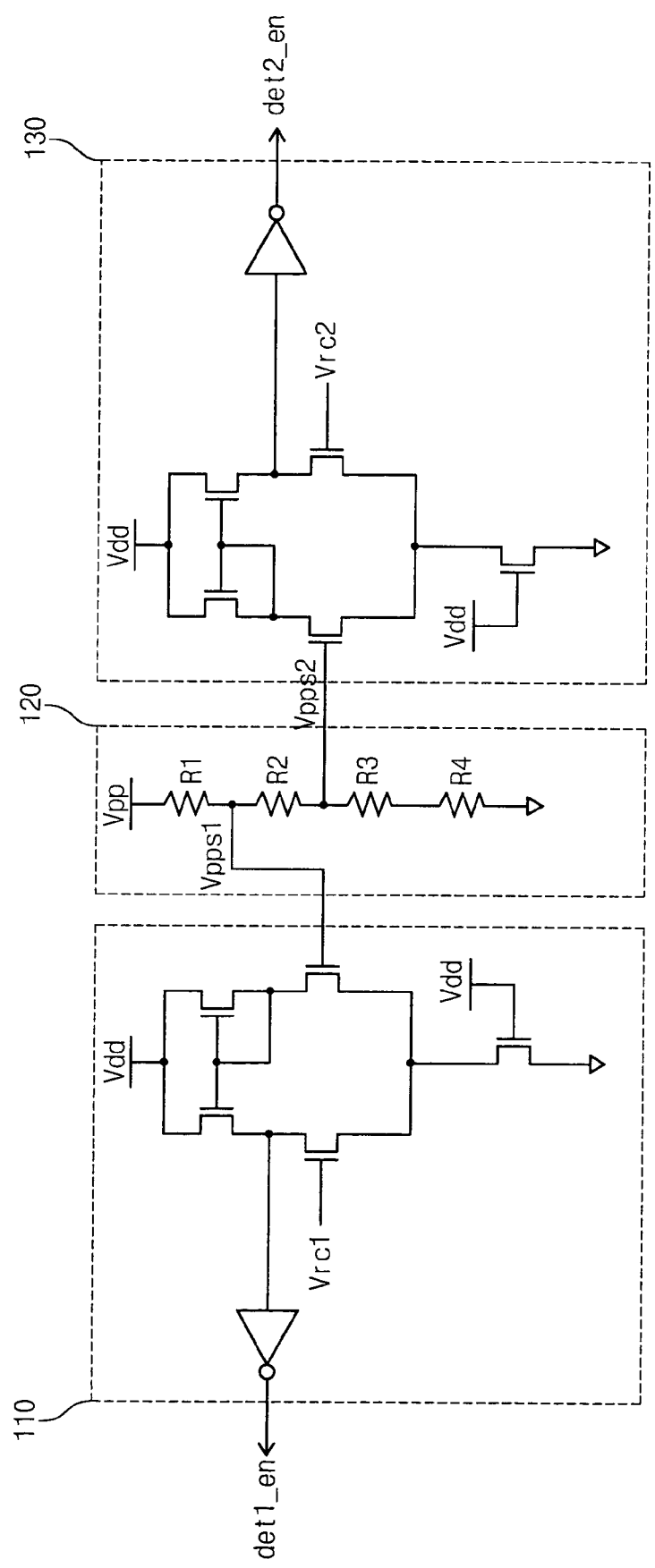
FIG. 6a is a circuit diagram illustrating a detector of FIG. 4.

FIG. 6a is a circuit diagram illustrating the detector 100 of FIG. 4. The detector 100 comprises a detection unit 120, a first comparator 110 and a second comparator 130. The detection unit 120 divides the driving voltage $V_{pp}$ to make two detection voltages $V_{pps1}$ and $V_{pps2}$. The first comparator 110 compares the detection voltage $V_{pps1}$ with a voltage $V_{rc1}$ corresponding to the predetection level. The second comparator 130 compares the detection voltage $V_{pps2}$ with a voltage $V_{rc2}$ corresponding to the target level. The detection levels $V_{pps1}$ and $V_{pps2}$ are represented by the following equations:

$$V_{pps1} = \frac{R_2 + R_3 + R_4}{R_1 + R_2 + R_3 + R_4} \times V_{pp}$$

$$V_{pps2} = \frac{R_3 + R_4}{R_1 + R_2 + R_3 + R_4} \times V_{pp}$$

The comparator 110 outputs a high level signal when the detection voltage $V_{pps1}$ becomes smaller than the voltage $V_{rc1}$. The second comparator 130 outputs a high level signal when the detection voltage $V_{pps2}$ becomes smaller than the voltage $V_{rc2}$.

Figure 6B:
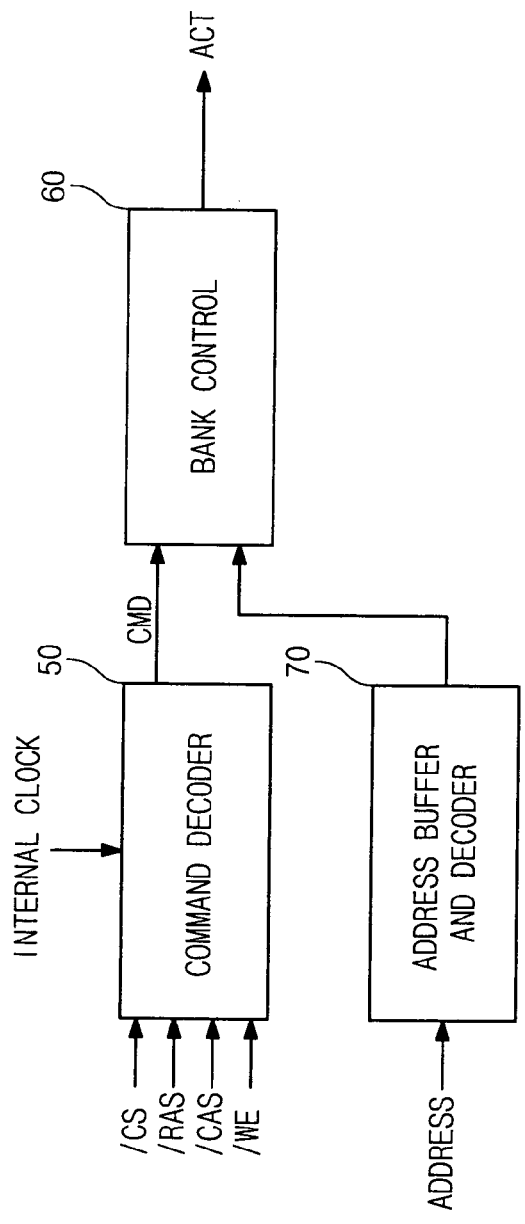
FIG. 6b is a block diagram illustrating an action decoder for generating an action signal ACT of FIG. 4.

FIG. 6b is a block diagram illustrating an action decoder for generating the action signal ACT of FIG. 4.

The action decoder comprises a command decoder 50, a bank controller 60 and an address buffer and address decoder 70. The command decoder 50 receives and decodes a chip selection signal/CS, a row address strobe signal/RAS, a column address strobe signal/CAS and a write enable signal/WE to output a corresponding command signal CMD. The command signal includes active, read, write, precharge and refresh signals. The address buffer and decoder 70 receives and decodes an address. The command signal CMD and the output signal of the address buffer and decoder 70 are inputted into the bank controller 60. The bank controller 60 outputs an action signal ACT. The action signal Act includes each bank active, each bank precharge, each bank read and each bank write.

Figure 6C:
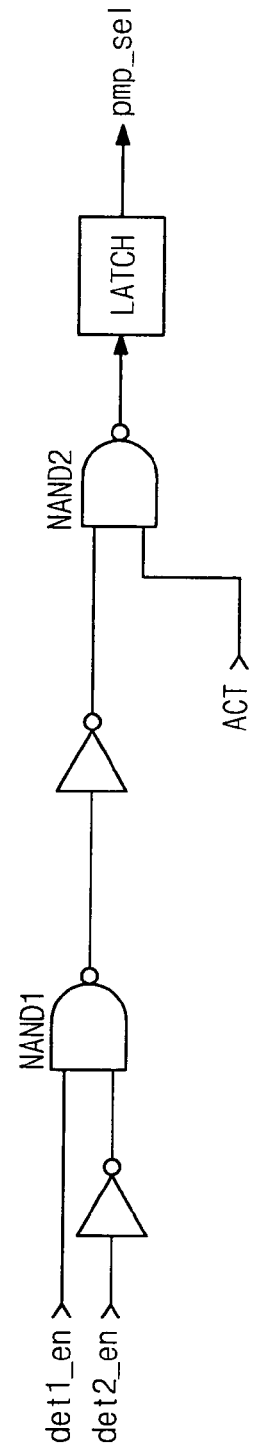
FIGS. 6c and 6d are block diagrams illustrating a controller of FIG. 4.
Figure 6D:
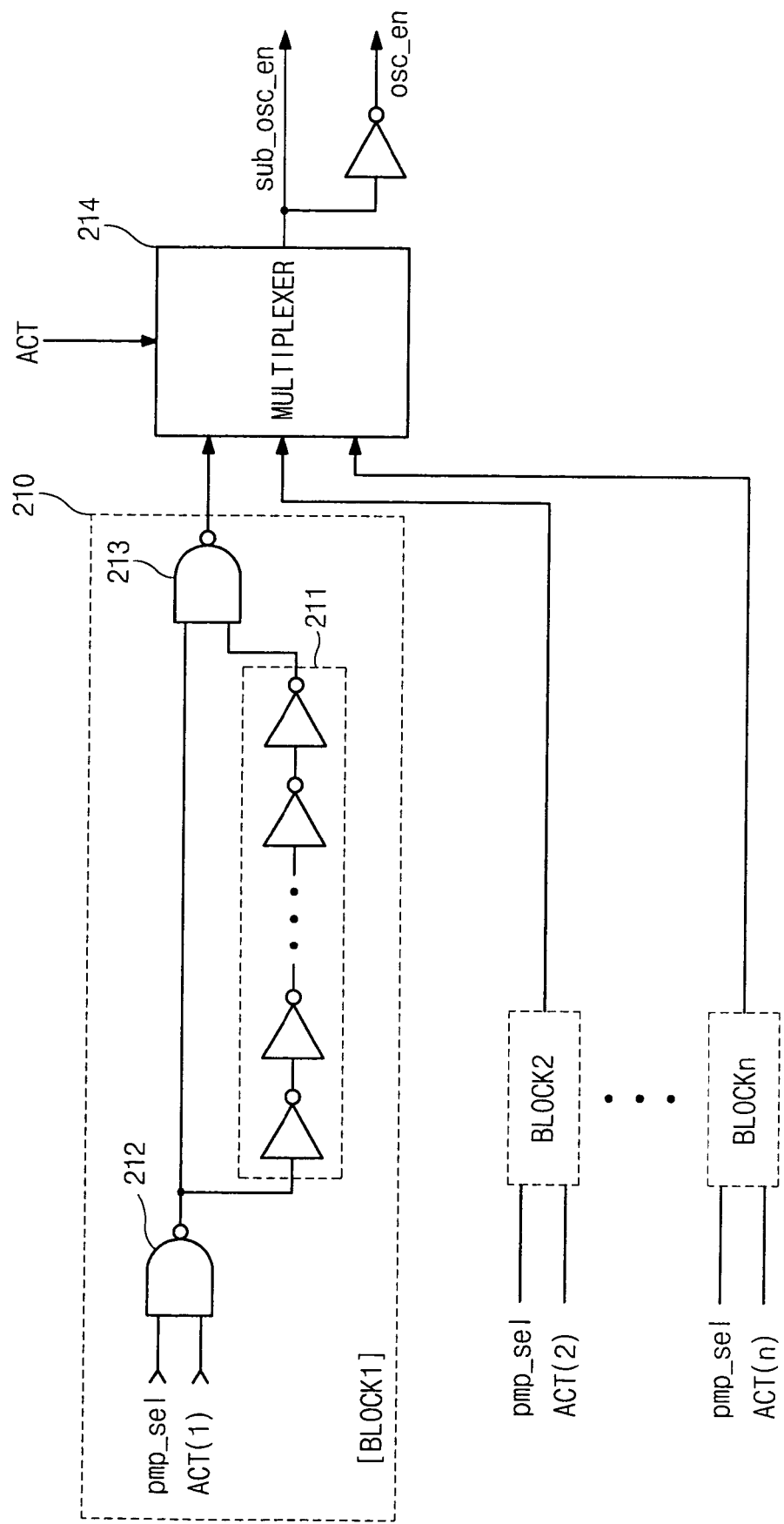

FIGS. 6c and 6d are block diagrams illustrating the controller 200 of FIG. 4.

FIG. 6c shows a circuit for activating a pump selection signal pmp_sel when the action command is inputted after activation of the predetection level signal det1_en and before activation of the target level signal det2_en.

A NAND gate NAND1 performs the NAND operation on the predetection level signal det1_en and a signal obtained by inverting the target level signal det2_en. A NAND gate NAND2 performs the NAND operation on the action signal ACT and a signal obtained by inverting an output signal of the NAND gate NAND1. An output signal from the NAND gate NAND2 is activated if the action signal ACT is inputted when the predetection level signal det1_en is at a "high" level and the target level signal det2_en is at a "low" level. A latch latches the output signal from the NAND gate NAND2, and then outputs the latched signal as the pump selection signal pmp_sel.

FIG. 6d shows a circuit for outputting oscillator control signals sub_osc_en and osc_en in response to the action command ACT and the pump selection signal pmp_sel.

In the preferred embodiment illustrated in FIG. 6d, since the oscillator control signals sub_osc_en and osc_en have opposite logic levels with respect to each other, the main oscillator 300 does not operate when the sub-oscillator 310 operates. However, the main oscillator 300 and the sub-oscillator 310 can operate simultaneously in other embodiments of the present invention.

A plurality of pulses having different activation times are inputted into a multiplexer 214. Each block (block 1, block 2, . . . , block n) for generating one of the plurality of pulses includes a delay circuit 211, such as an inverter chain. The delay time of the delay circuit 211 is configured to be different according to the action signal ACT. Since the multiplexer 214 selects and outputs one of the output signals from the blocks (block 1, block 2, . . . , block n) according to the action signal ACT, the time when the oscillator control signal sub_osc_en is maintained at an active state is differentiated according to the action signal ACT.

Since the sub-oscillator 310 outputs the oscillating signal only when the oscillator control signal sub_osc_en is in the active state, the amount of pumped charge can be regulated according to the action signal ACT.

Accordingly, in the disclosed voltage generator, the level of the driving voltage Vpp can be prevented from excessively fluctuating by operating the sub-pump before operating the main pump. As a result, noise which may result from excessive fluctuation of the driving voltage can be reduced. Additionally, electric power necessary for maintaining the driving voltage Vpp above the target level can be reduced because the amount of charge to be pumped decreases as the variation of the driving voltage decreases.

While the invention is susceptible to various modifications and alternative forms, specific embodiments have been shown by way of example in the drawings and described in detail herein. However, it should be understood that the invention is not limited to the particular forms disclosed. Rather, the invention covers all modifications, equivalents, and alternatives falling within the spirit and scope of the invention as defined in the appended claims.

What is claimed is:

1. A voltage generator comprising:
    a detector for comparing an output voltage of the voltage generator with a first reference voltage to output a first sensing signal and comparing the output voltage of the voltage generator with a second reference voltage lower than the first reference voltage to output a second sensing signal;
    a controller controlled by an action signal for outputting a first control signal and a second control signal in response to the first sensing signal and the second sensing signal, respectively;
    a sub-booster for boosting the output voltage in response to the first control signal;
    a main booster for boosting the output voltage in response to the second control signal; and
    a voltage adder for adding output signals from the sub-booster and the main booster to provide the output voltage,
    wherein the controller comprises:
        an action detector for combining the first sensing signal and the second sensing signal, and the action signal to generate an output signal;
        a latch for latching the output signal from the action detector; and
        a sub-controller for receiving an output signal from the latch and the action signal to output the first control signal and the second control signal.

2. The voltage generator according to claim 1, wherein the detector comprises:
    a sensing voltage generator for dividing the output voltage to generate a first sensing voltage and a second sensing voltage lower than the first sensing voltage;
    a first comparator for comparing the first sensing voltage and the first reference voltage to output the first sensing signal; and
    a second comparator for comparing the second sensing voltage and the second reference voltage to output the second sensing signal.

3. The voltage generator according to claim 1, wherein the sub-controller comprises:
    a plurality of pulse generating blocks, each of which outputs a pulse in response to the action signal and the output signal from the latch; and
    a multiplexer for selecting one pulse among a plurality of pulses in response to the action signal to output the one pulse as the first control signal and the second control signal.

4. The voltage generator according to claim 3, wherein the pulse generating block comprises:
    a first operating means for performing a NAND operation on the output signal from the latch and the action signal;
    an delay circuit for delaying an output signal from the first operating means for a predetermined time according to the action signal; and
    a second operating means for performing a NAND operation on the output signal from the first operating means and an output signal from the delay circuit to provide an output.

5. The voltage generator according to claim 1, wherein the main booster comprises:
    an oscillator for outputting an oscillating signal in response to the second control signal;
    a control driver for decoding the oscillating signal to output a plurality of capacitor precharge signals and a plurality of charge transport signals; and
    a pump circuit for charging capacitors in response to the plurality of capacitor precharge signals and pumping charges stored in the capacitors in response to the plurality of charge transport signals to boost the output voltage.

6. The voltage generator according to claim 1, wherein the sub-booster comprises:
    an oscillator for outputting an oscillating signal in response to the second control signal;
    a control driver for decoding the oscillating signal to output a plurality of capacitor precharge signals and a plurality of charge transport signals; and
    a pump circuit for charging capacitors in response to the plurality of capacitor precharge signals and pumping charges stored in the capacitors in response to the plurality of charge transport signals to boost the output voltage.

7. The voltage generator according to claim 1, wherein
the detector further compares the output voltage with a third reference voltage greater than the first reference voltage to output a third sensing signal, and
the controller further receives the third sensing signal and the action signal to output a third control signal,
further comprising a second sub-booster for boosting a voltage in response to the third control signal, and wherein the voltage adder adds output signals from the sub-booster, the second sub-booster and the main booster to provide the output voltage.

8. A voltage generator comprising:
means for comparing an output voltage of the voltage generator with a first reference voltage to output a first sensing signal and comparing the output voltage of the voltage generator with a second reference voltage lower than the first reference voltage to output a second sensing signal;
means controlled by an action signal for outputting a first control signal and a second control signal in response to the first sensing signal and the second sensing signal, respectively;
means for boosting the output voltage in response to the first control signal;
means for boosting the output voltage in response to the second control signal; and
means for adding output signals from the sub-booster and the main booster to provide the output voltage,
wherein the means for outputting further comprises:
means for combining the first sensing signal, the second sensing signal, and the action signal to generate an output signal;
means for latching the output signal from the means for combining; and
means for receiving an output signal from the means for latching and the action signal to output the first control signal and the second control signal.

9. The voltage generator according to claim 8, wherein the means for comparing further comprises:
means for dividing the output voltage to generate a first sensing voltage and a second sensing voltage lower than the first sensing voltage;
means for comparing the first sensing voltage and the first reference voltage to output the first sensing signal; and
means for comparing the second sensing voltage and the second reference voltage to output the second sensing signal.

10. The voltage generator according to claim 8, wherein the means for receiving an output signal from the latch and the action signal further comprises:

means for generating a plurality of pulses each in response to the action signal and the output signal from the latch; and
means for selecting one pulse among a plurality of pulses in response to the action signal to output the one pulse as the first control signal and the second control signal.

11. The voltage generator according to claim 10, wherein the means for generating a plurality of pulses further comprises:
first operating means for performing a NAND operation on the output signal from the latch and the action signal to generate an output signal;
means for delaying an output signal from the first operating means for a predetermined time according to the action signal to generate an output signal; and
second operating means for performing a NAND operation on the output signal from the first operating means and the output signal from the means for delaying.

12. The voltage generator according to claim 8, wherein the means for boosting a voltage in response to the second control signal further comprises:
means for outputting an oscillating signal in response to the second control signal;
means for decoding the oscillating signal to output a plurality of capacitor precharge signals and a plurality of charge transport signals; and
means for charging charges capacitors in response to the plurality of capacitor precharge signals and pumping charges stored in the capacitors in response to the plurality of charge transport signals to boost the output voltage.

13. Voltage generator according to claim 8, wherein the means for boosting the output voltage in response to the first control signal comprises:
means for outputting an oscillating signal in response to the second control signal;
means for decoding the oscillating signal to output a plurality of capacitor precharae signals and a plurality of charge transport signals; and
means for charging charges capacitors in response to the plurality of capacitor precharge signals and pumping charges stored in the capacitors in response to the plurality of charge transport signals to boost the output voltage.

* * * * *